E. M. Stevens.
Pegging Machine.
No 2833 Reissued Jan. 14, 1868.
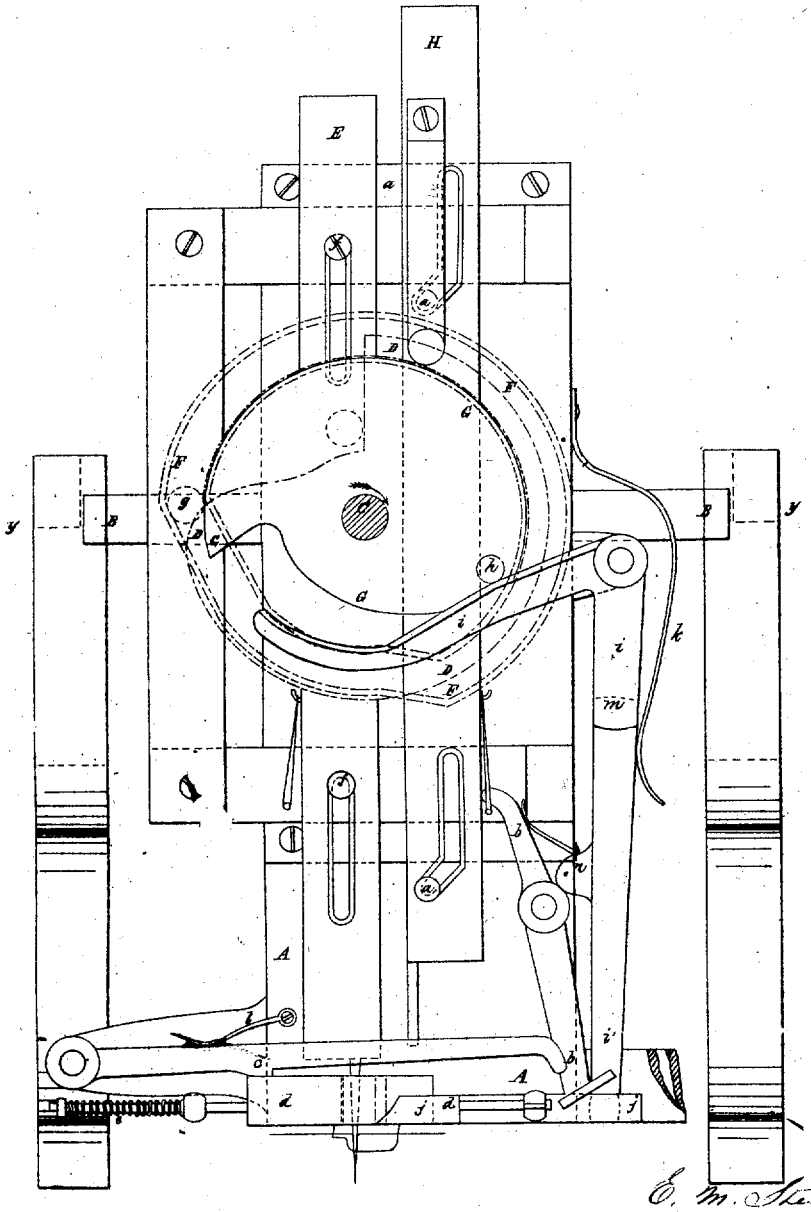
Witnesses.
Thos. R. Roach
R. E. Teschemacher
E. M. Stevens
by his Attorney
Saml. Cowdrey

BEST AVAILABLE COPY

UNITED STATES PATENT OFFICE.

WILLIAM N. ELY, OF STRATFORD, CONN., ASSIGNEE OF EDGAR M. STEVENS.

IMPROVED PEGGING-MACHINE.

Specification forming part of Letters Patent No. 65,294, dated May 28, 1867; Reissue No. 2,833, dated January 14, 1868.

*To all whom it may concern:*

Be it known that EDGAR M. STEVENS, of Boston, Massachusetts, has invented certain Improvements in Awl-Feed Pegging-Machines, which are described and represented in the following specification and accompanying drawing, which gives a sectional view of the machine.

The invention relates to a method of feeding the work, in combination with other peculiarly-arranged parts of such machines; and it consists, among other things, in feeding the work by a movement of the awl when it is connected with a head so hung as to conform to the surface curvatures of the sole; and its object is to secure perfect and uniform pegging round short curves or otherwise. This is attained by a combination of the vibrating awl, when used as a feeding-instrument, with a sliding swinging head, which supports the pegging mechanism and presents it properly to the work; and also relates to the methods of operating the awl-bar and the peg-driver bar and their positions.

In the drawing, A is a casting, which forms a head or support for the pegging mechanism. It has pivots B, by which it is hung in slides or ways *y y*, in which the pivots or axes B B can move up and down, so that it can swing as well as slide, (or it may be made to slide sidewise as well as up and down.)

C is a cam-shaft connected to a driving-wheel by a joint-link or otherwise, which will permit the various movements of the head while it rotates the cam-shaft.

D (shown by red lines) is the cam by which the awl-bar E is raised.

F (shown by blue lines) is the cam which gives the awl-bar its sidewise movement.

G (shown by black lines) is the cam which lifts the peg-driver bar H. The downward movement of the awl and peg-driver is given by the contraction of suitable springs, *s s'*, when by the rotation of the cams the projections from the bars are allowed to fall from the points D and G. These springs are attached by one end to A. The awl and peg-driver may be driven down by means of cams or weights acting as hammers. The pins *a a*, acting on the inclined slots in the peg-driver during its vertical movement, give it a sidewise movement, so that the awl-bar will not interfere with it, and so that in the last portion of its rise it will act on the lever *b*, which acts on the catch *c*, and liberates the peg-tube *d* when the spiral spring *e* draws it to the position shown in the drawing, or the lever *b* and catch *c* may be dispensed with, and the lever *i* be divided into two parts, pivoted together at *m*, and the lower part pivoted to the frame at *n*, in which case the depression of the bent part of lever *i* by the pin *h* will cause the lower part at *i'* to move the knife-bar *j* to the left and cut the peg, and the spring *k* will return it after it has done its duty. The awl will strike through the peg-tube carrier *d* through or to the left of the peg-tube as it descends, and as it moves laterally it will carry the peg-tube to the right. The withdrawal of the awl will liberate the peg-tube and allow the spring *e* to draw it to its proper position for the action of the peg-driver. The awl-bar E is guided in its rise and fall by the pins *f f*, fitting in slots therein. These pins are fixed in a sliding frame, which is guided by suitable ways formed in the head. Another pin, *g*, fixed in the same frame, projects from it into the cam F, which in its rotation by the means described gives the sidewise or feeding movement of the awl. The pin *h* acts on the bent lever *i*, which actuates the knife *j*, by which the pegs are split from the peg-wood. The spring *k* also acts on the lever *i* to return it to the position it occupied before the pin *h* moved it. The peg-tube *d* is secured to the head by suitable slides and ways, and is brought forward by the forward sidewise movement of the awl when it feeds the work, so that the recess cut therein for the reception of the peg when cut from the wood, and through or into which the awl and peg-driver pass, will be in the place indicated by red lines. In this movement of *d* it will raise the catch or latch *c*, which is so arranged that a spring, *l*, will throw the latch *c* down, holding the peg-tube against the action of the spring *e* during the driving of the peg, and until the peg-driver is raised nearly to its full height.

The peg-carrier is represented as broken from the head, as it does not differ from the common peg-carriers.

The springs for driving the awl and peg-driver may be spiral and attached to the upper ends of the awl and driver-bars, or in any way fit for their purposes.

The order of driving a peg is as follows: Premising that the cam D is nearly in the position shown in the drawing, rotation of the shaft C causes the awl to come down through the peg-tube into the work. It is then moved forward by the cam F, then raised by the operation of the cam D, and then moved back sidewise by the cam F. During these operations the pin *h* has withdrawn the knife and held it until the peg-wood was forced into the tube, when, the pin rotating on or beyond the lever *i*, the knife *j* is brought forward, splitting the peg from the wood and forming the fourth side to the peg-tube. The driver now descends and drives the peg in the tube, and at once resumes its former position, in doing which it acts on the lever *b*, which raises the latch *c*, which is then moved by the spring *e* under the awl, and the next rotating of the cam-shaft repeats the operation. When the peg-tube is so placed that the recess cut therein for the reception of the peg is at the place indicated by red lines, the knife is withdrawn long enough to permit the peg-wood to be forced forward. The knife then advances, cuts the peg from the wood, and remains in this position, forming the fourth side of a box inclosing the peg, that it may be driven without being bent or broken. The peg is designed to be cut rather than split from the peg-wood strip.

As the invention has reference, among other things, to a sidewise movement of the awl when used for feeding the work, when combined with a head for supporting the pegging mechanism, which has a sliding or sliding and swinging movement, or a vertically and laterally moving head, I do not desire to limit myself to my particularly described mechanism, but have regard to analogous or equivalent devices for producing similar results in machines similarly operated.

What is claimed, therefore, and desired to be secured by Letters Patent, is—

1. The combination of a vibrating moving awl with a sliding or vertically-moving or a swinging head, substantially as described.

2. The combination of a feeding-awl with a sliding and swinging head, or with a sliding head or with a swinging head, substantially as described.

3. Raising and driving the awl-bar and peg-driving bar, or either of them, positively and directly, by means substantially as described, in combination with a laterally-moving or feeding awl.

4. So constructing the parts that the awl-bar, moving up and down perpendicularly to its carriage, shall also move laterally, substantially as and for the purposes described.

5. In combination with the foregoing, the laterally and vertically moving peg-driving bar, substantially as and for the purposes described.

6. Constructing and arranging the knife in relation to the driver and peg-tube, substantially as described.

7. Cutting the peg from the strip, substantially as described.

WILLIAM N. ELY.

Witnesses:
W. M. PARKER,
A. B. ELY.